(12) United States Patent
Hoshino

(10) Patent No.: US 9,774,025 B2
(45) Date of Patent: Sep. 26, 2017

(54) POWER STORAGE APPARATUS

(71) Applicant: NGK Insulators, Ltd., Nagoya-Shi (JP)

(72) Inventor: Koji Hoshino, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 182 days.

(21) Appl. No.: 14/639,514

(22) Filed: Mar. 5, 2015

(65) Prior Publication Data
US 2015/0180012 A1    Jun. 25, 2015

Related U.S. Application Data

(63) Continuation of application No. PCT/JP2013/075236, filed on Sep. 19, 2013.

(30) Foreign Application Priority Data

Sep. 26, 2012  (JP) ................. 2012-211740

(51) Int. Cl.
| H01M 2/34 | (2006.01) |
| H01M 2/20 | (2006.01) |
| H01M 2/10 | (2006.01) |
| H01M 10/39 | (2006.01) |
| H01M 10/48 | (2006.01) |

(52) U.S. Cl.
CPC ........... *H01M 2/34* (2013.01); *H01M 2/1077* (2013.01); *H01M 2/1088* (2013.01); *H01M 2/204* (2013.01); *H01M 2/206* (2013.01); *H01M 2/208* (2013.01); *H01M 10/3909* (2013.01); *H01M 10/482* (2013.01); *H01M 2200/00* (2013.01)

(58) Field of Classification Search
CPC .................. H01M 2/1077; H01M 10/482

USPC ......................................... 429/121
See application file for complete search history.

(56) References Cited

U.S. PATENT DOCUMENTS

2012/0135296 A1    5/2012   Itoi et al.
2015/0180017 A1    6/2015   Hoshino

FOREIGN PATENT DOCUMENTS

| CN | 104620413 A | 5/2015 |
| EP | 2 903 053 A1 | 8/2015 |

(Continued)

OTHER PUBLICATIONS

Extended European Search Report (Application No. 13842238.1) dated Apr. 6, 2016.

(Continued)

*Primary Examiner* — Nicholas P D'Aniello
*Assistant Examiner* — Abibatu Ojo-Amoo
(74) *Attorney, Agent, or Firm* — Burr & Brown, PLLC

(57) ABSTRACT

Two or more module batteries are arranged in an array and connected through wiring. The outer surface of a first side wall of a case faces in a first direction without facing the others of the two or more module batteries. Second and third side walls of the case are spaced from each other in a second direction. The first direction and the second direction are perpendicular to each other. Two or more string groups are arranged linearly in the second direction. The positive electrode current collecting part extends along the inner surface of the second side wall, the positive electrode extension part extends along the inner surface of the first side wall, and the positive electrode feedthrough part penetrates through the first side wall. The positive electrode current collecting part, the positive electrode extension part, the positive electrode feedthrough part, and the wiring are electrically connected to one another.

4 Claims, 15 Drawing Sheets

(56) References Cited

FOREIGN PATENT DOCUMENTS

| | | |
|---|---|---|
| JP | 06-290768 A | 10/1994 |
| JP | 07-245123 A | 9/1995 |
| JP | 09-029338 A | 2/1997 |
| JP | 2002-148321 A | 5/2002 |
| JP | 2003-229103 A | 8/2003 |
| JP | 2011-134549 A | 7/2011 |
| JP | 2012-049038 A | 3/2012 |
| JP | 3177968 U | 8/2012 |
| JP | 3177969 U | 8/2012 |
| WO | 2011/151981 A1 | 12/2011 |

OTHER PUBLICATIONS

Chinese Office Action, Chinese Application No. 201380049677.8, dated May 31, 2016 (4 pages).

International Search Report and Written Opinion (With English Translation); International Application No. PCT/JP2013/075236, dated Nov. 5, 2013 (8 pages).

F I G. 2
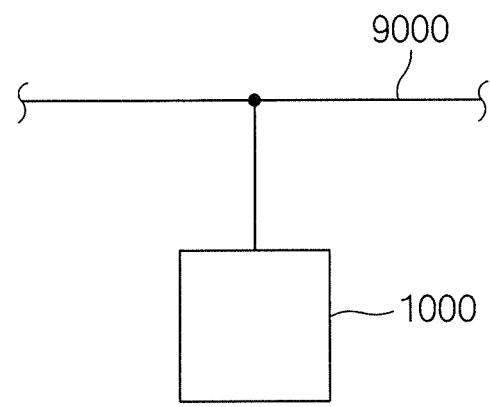

POWER STORAGE APPARATUS

TECHNICAL FIELD

The present invention relates to a power storage apparatus.

BACKGROUND ART

Module batteries of sodium-sulfur batteries have a large number of cells connected to one another. For example, as disclosed in Patent Literature 1, two or more cells connected in series fond a string, two or more strings connected in parallel form a string group, and two or more string groups are connected in series. The two or more string groups are arranged linearly. The positive electrode current collecting plate is along the inner surface of one side wall, and the positive pole (terminal) penetrates through the one side wall. The negative electrode current collecting plate is along the inner surface of the other side wall, and the negative pole (terminal) penetrates through the other side wall. The one and other side walls face each other.

PRIOR ART LITERATURE

Patent Literature

Patent Literature 1: Japanese Patent Application Laid-Open No.7-245123 (1995)

SUMMARY OF THE INVENTION

Problems to be Solved by the Invention

A power storage apparatus has two or more module batteries arranged in different directions including a right-left direction, a back-and-forth direction, and an up-down direction. If, as disclosed in Patent Literature 1, the positive pole penetrates through one side wall and the negative pole penetrates through the other side wall, the operation of coupling one and other module batteries to wiring in a space between these module batteries is performed depending on the arrangement of the two or more module batteries. It is thus not easy to assemble the power storage apparatus.

To eliminate this operation, it is conceivable to avoid linear arrangement of two or more string groups and instead to involve turns in the arrangement of two or more string groups. Such turns in the arrangement of two or more string groups, however, can easily cause short circuits between one and other string groups and easily compromise the safety of the power storage apparatus.

The present invention has been achieved in light of such a problem. It is an object of the present invention to achieve both improved safety of the power storage apparatus and easy assembly of the power storage apparatus.

Means for Solving Problems

The present invention is directed to a power storage apparatus.

In a first aspect of the present invention, the power storage apparatus includes two or more module batteries, and wiring. The two or more module batteries are arranged in an array and connected through the wiring.

Each of the two or more module batteries includes a case, a cell assembly, a positive bus, and a negative bus.

The case has an accommodation space therein. The case includes a first side wall, a second side wall, and a third side wall. The outer surface of the first side wall faces in a first direction without facing the others of the two or more module batteries.

The second side wall and the third side wall are spaced from each other in a second direction. The first direction and the second direction are perpendicular to each other.

The cell assembly is housed in the accommodation space. The cell assembly includes two or more string groups that are connected in series. The two or more string groups are arranged linearly in the second direction. Each of the two or more string groups includes two or more strings that are connected in parallel. Each of the two or more strings includes two or more cells that are connected in series.

The positive bus includes a positive electrode current collecting part, a positive electrode extension part, and a positive electrode feedthrough part. The positive electrode current collecting part and the positive electrode extension part are housed in the accommodation space. The positive electrode current collecting part extends along the inner surface of the second side wall. The positive electrode extension part extends along the inner surface of the first side wall. The positive electrode feedthrough part penetrates through the first side wall. The positive electrode current collecting part, the positive electrode extension part, the positive electrode feedthrough part, and the wiring are electrically connected to one another.

The negative bus includes a negative electrode current collecting part, a negative electrode extension part, and a negative electrode feedthrough part. The negative electrode current collecting part and the negative electrode extension part are housed in the accommodation space. The negative electrode current collecting part extends along the inner surface of the third side wall. The negative electrode extension part extends along the inner surface of the first side wall. The negative electrode feedthrough part penetrates through the first side wall. The negative electrode current collecting part, the negative electrode extension part, the negative electrode feedthrough part, and the wiring are electrically connected to one another.

A second aspect of the present invention provides an additional feature with the first aspect of the present invention.

In the second aspect of the present invention, each of the two or more module batteries includes a positive-electrode positioning mechanism and a negative-electrode positioning mechanism. The positive-electrode positioning mechanism restricts vertical downward movement of the positive electrode current collecting part from a base position of the positive electrode current collecting part. The negative-electrode positioning mechanism restricts vertical downward movement of the negative electrode current collecting part from a base position of the negative electrode current collecting part.

A third aspect of the present invention provides an additional feature with the first or second aspect of the present invention.

In the third aspect of the present invention, the case has an outlet. The cell assembly includes a parallel bus. The parallel bus connects the two or more strings in parallel. Each of the two or more module batteries includes a positive-voltage measuring wire, a negative-voltage measuring wire, and an intermediate-voltage measuring wire. The positive-voltage measuring wire is connected to the positive electrode current collecting part. The negative-voltage measuring wire is connected to the negative electrode current collecting part. The intermediate-voltage measuring wire is connected to the parallel bus. The positive-voltage measuring wire, the negative-voltage measuring wire, and the intermediate-voltage measuring wire are drawn to the outside of the case through the outlet.

Advantageous Effects of the Invention

According to the first aspect of the present invention, a short circuit is not easily formed between one and another string groups. This improves the safety of the power storage apparatus, prevents the remaining module batteries from inhibiting coupling of the module batteries to wiring, and facilitates the assembly of the power storage apparatus.

According to the second aspect of the present invention, it is possible to prevent vertical downward movement of the positive and negative buses from their base positions. This stabilizes the structures of the module batteries.

According to the third aspect of the present invention, the voltages across the string groups can be accurately measured. This enables accurate detection of failures in cells.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a schematic diagram illustrating an example of use of the power storage apparatus.

EMBODIMENT FOR IMPLEMENTING THE INVENTION (Overview of Power Storage Apparatus)

Figure 1:
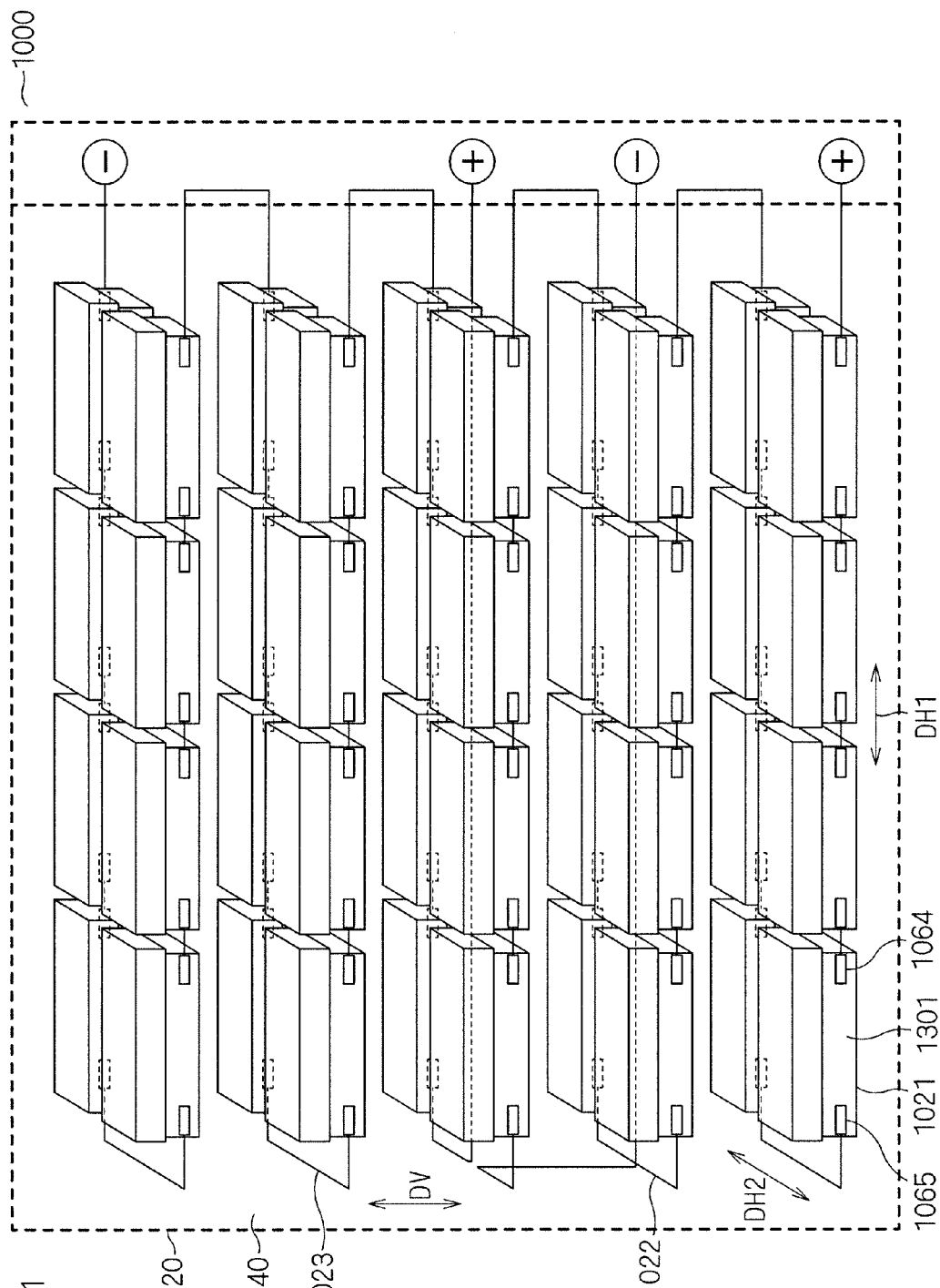
FIG. 1 is a schematic diagram of a power storage apparatus.

A schematic diagram of FIG. 1 illustrates a desirable embodiment of a power storage apparatus.

As illustrated in FIG. 1, a power storage apparatus 1000 includes a housing 1020, 40 module batteries 1021, a first wire 1022, and a second wire 1023.

The number of module batteries 1021 included in the power storage apparatus 1000 may increase or decrease. In general, the power storage apparatus 1000 includes two or more module batteries 1021.

The 40 module batteries 1021 are arranged in a rectangular parallelepiped grid. The 40 module batteries 1021 are arranged in four columns in the right-left direction DH1, two rows in the back-and-forth direction DH2, and five stages in the up-down direction DV. The right-left direction DH1 and the back-and-forth direction DH2 are horizontal, and the up-down direction DV is vertical. The right-left direction DH1, the back-and-forth direction DH2, and the up-down direction DV are perpendicular to one another. The arrangement of the 40 module batteries 1021 may form a grid of different shapes other than a rectangular parallelepiped. It is possible to increase or decrease all or some of the number of columns in the right-left direction DH1, the number of rows in the back-and-forth direction DH2, and the number of stages in the up-down direction DV.

The eight module batteries 1021 in the first stage from the bottom of the up-down direction DV, the eight module batteries 1021 in the second stage from the bottom of the up-down direction DV, and the four module batteries 1021 in the third stage from the bottom of the up-down direction DV and in the first row from the front of the back-and-forth direction DH2 are connected in series by the first wire 1022. The four module batteries 1021 in the third stage from the bottom of the up-down direction DV and in the second row from the front of the back-and-forth direction DH2, the eight module batteries 1021 in the fourth stage from the bottom of the up-down direction DV, and the eight module batteries 1021 in the fifth stage from the bottom of the up-down direction DV are connected in series by the second wire 1023. The number of module batteries 1021 connected in series may increase or decrease. Alternatively, all or some of the 40 module batteries 1021 may be connected in parallel.

The power storage apparatus 1000 may also include other constituent elements aside from those described above. For example, the power storage apparatus 1000 may include other equipment such as electric power equipment, control equipment, and air conditioning equipment. The electric power equipment includes, for example, an AC-DC converter (PCS), a transformer, a voltage sensor, and a current sensor.

The housing 1020 forms a housing space 1040 therein. The 40 module batteries 1021, the first wire 1022, and the second wire 1023 are housed in the housing space 1040.

In the case of charging the power storage apparatus 1000, electric power is supplied from the outside of the power storage apparatus 1000 to the module batteries 1021 via the first wire 1022 or the second wire 1023 so that the module batteries 1021 are charged. In the case of discharging the power storage apparatus 1000, electric power is discharged from the module batteries 1021 and supplied from the module batteries 1021 to the outside of the power storage apparatus 1000 via the first wire 1022 or the second wire 1023.

(Example of Use of Power Storage Apparatus)

A schematic diagram of FIG. 2 illustrates an example of use of the power storage apparatus.

As illustrated in FIG. 2, the power storage apparatus 1000 is connected to an electric power system 9000 and used for various applications such as preventing power failures or controlling the supply and demand of electric power.

(Overview of Module Battery)

Figure 3:
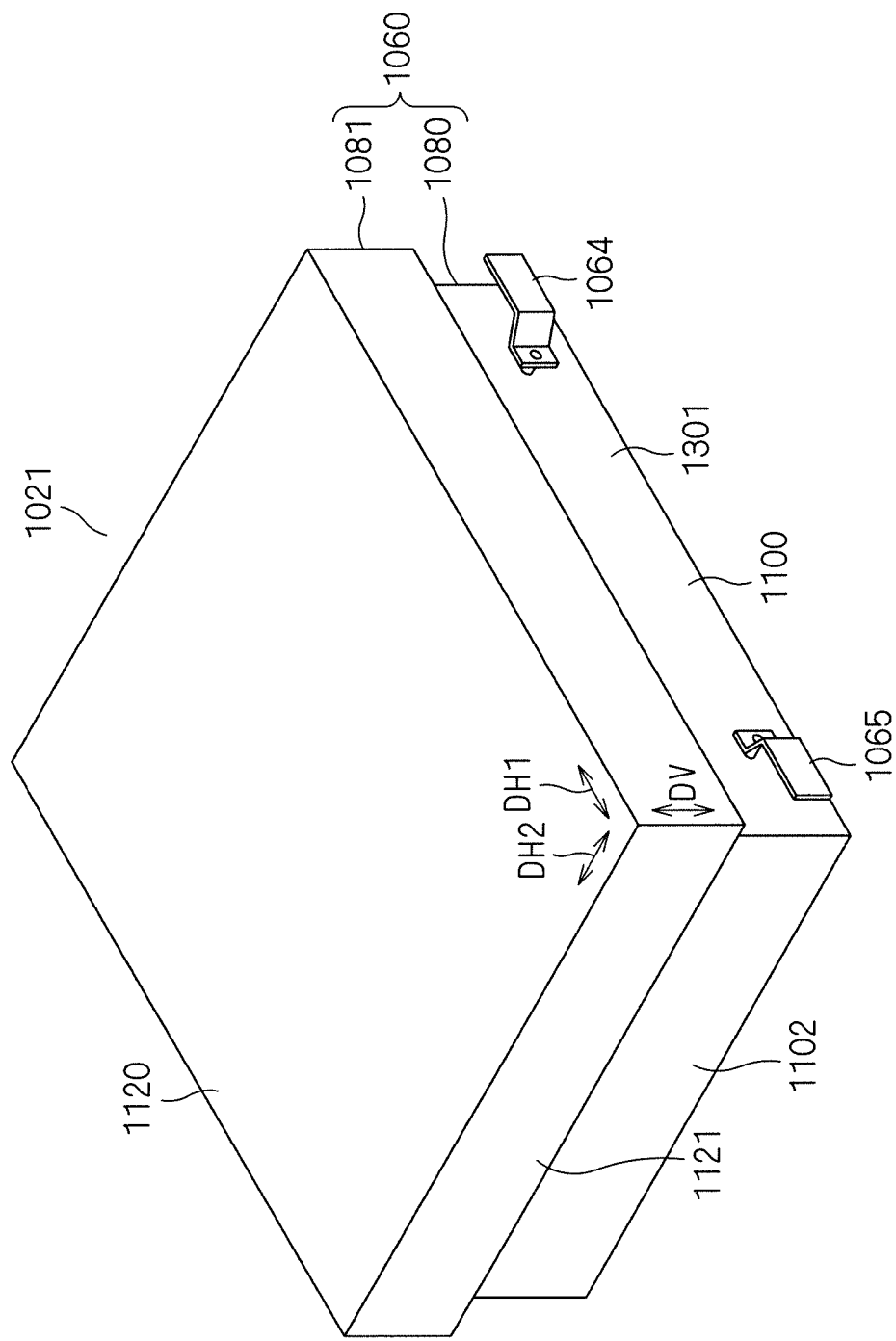
FIG. 3 is a perspective view of a module battery.
Figure 4:
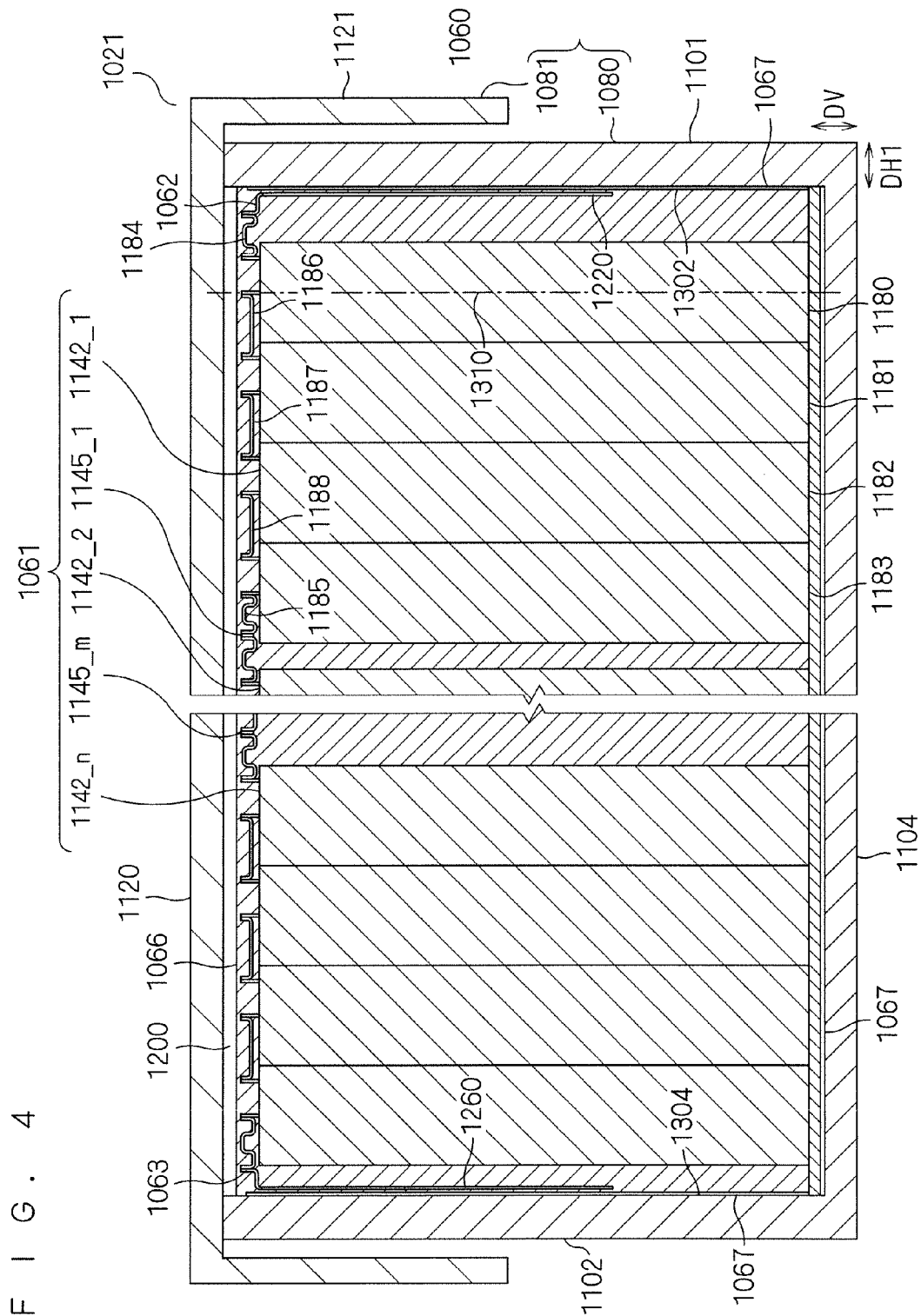
FIG. 4 is a vertical cross-sectional view of the module battery.

A schematic diagram of FIG. 3 is a perspective view of a module battery. A schematic diagram of FIG. 4 is a vertical cross-sectional view of the module battery. Schematic diagrams of FIGS. 5 to 8 are horizontal cross-sectional views of the module battery. FIGS. 5 to 8 illustrate the module battery excluding accessories of a positive bus, accessories of a negative bus, sand, and a heater, which will be described later. FIGS. 5 to 8 respectively illustrate the right front side, left front side, right back side, and left back side of the module battery.

As illustrated in FIGS. 3 to 8, each of the 40 module batteries 1021 includes a case 1060, a cell assembly 1061, a positive bus 1062, a negative bus 1063, a positive bus bar 1064, a negative bus bar 1065, sand 1066, and a heater 1067.

The case 1060 comprises a vacuum insulation container 1080 and an atmospheric insulation lid 1081. The vacuum insulation container 1080 has a shape of about a rectangular parallelepiped and includes a first side wall 1100, a second side wall 1101, a third side wall 1102, a fourth side wall 1103, and a bottom wall 1104. The first side wall 1100 and the fourth side wall 1103 face each other with the accommodation space 1200 therebetween. The second side wall 1101 and the third side wall 1102 face each other with the accommodation space 1200 therebetween. The atmospheric insulation lid 1081 includes a ceiling wall 1120 and a flange 1121.

The cell assembly 1061 is an assembly of 4×n×p cells and necessary wires.

The cell assembly 1061 includes n string groups 1142_1, 1142_2, . . . , and 1142_n and m parallel buses 1145_1, 1145_2, . . . , and 1145_m. The number n of string groups included in each module battery 1021 is two or more. Alternatively, the number n of string groups included in each module battery 1021 may be one. The number m of parallel buses increases or decreases depending on the number n of string groups.

Each of the n string groups 1142_1, 1142_2, . . . , and 1142_n includes p strings 1160. The number p of strings 1160 included in each of the n string groups 1142_1, 1142_2, . . . , and 1142_n is two or more.

Each of the n×p strings 1160 includes a first cell 1180, a second cell 1181, a third cell 1182, a fourth cell 1183, a first fuse 1184, a second fuse 1185, a first cell connector 1186, a second cell connector 1187, and a third cell connector 1188. The number of cells may increase or decrease. In general, each of the n×p strings 1160 includes two or more cells.

The case 1060 has an accommodation space 1200 therein. The cell assembly 1061, a major part of the positive bus 1062, a major part of the negative bus 1063, the sand 1066, and the heater 1067 are housed in the accommodation space 1200. The positive bus bar 1064 and the negative bus bar 1065 are disposed outside the case 1060.

In the case of charging the module battery 1021, the charging current flows from the positive bus bar 1064 through the interior of the module battery 1021 to the negative bus bar 1065 so that the first cell 1180, the second cell 1181, the third cell 1182, and the fourth cell 1183 are charged. In the case of discharging the module battery 1021, the discharge current flows from the negative bus bar 1065 through the interior of the module battery 1021 to the positive bus bar 1064 so that the first cell 1180, the second cell 1181, the third cell 1182, and the fourth cell 1183 are discharged.

The first cell 1180, the second cell 1181, the third cell 1182, and the fourth cell 1183 are all sodium-sulfur batteries. In the case of charging or discharging the module battery 1021, the temperature in the accommodation space 1200 is adjusted by the heater 1067 to a temperature at which the sodium-sulfur batteries can operate. For example, the temperature in the accommodation space 1200 is adjusted to about 300° C. The sodium-sulfur batteries may be replaced by other types of secondary batteries.

(Arrangement of Side Walls)

As illustrated in FIG. 1, outer surfaces 1301 of the first side walls 1100 of the 20 module batteries 1021 in the first row from the front of the back-and-forth direction DH2 face forward in the back-and-forth direction DH2 and each do not face the other 39 module batteries 1021. Also, outer surfaces 1301 of the first side walls 1100 of the 20 module batteries 1021 in the second row from the front of the back-and-forth direction DH2 face backward in the back-and-forth direction DH2 and each do not face the other 39 module batteries 1021. It is thus easy to reach the outer surfaces 1301 of the first side walls 1100 of the module batteries 1021.

As illustrated in FIGS. 3 to 8, the second side wall 1101 and the third side wall 1102 are spaced from each other in the right-left direction DH1 (width direction of the module battery 1021).

(Arrangement of Cells, Strings, and String Groups)

As illustrated in FIGS. 4 to 8, the n string groups 1142_1, 1142_2, . . . , and 1142_n are arranged linearly in the right-left direction DH1 (width direction of the module battery 1021). The arrangement of the n string groups 1142_1, 1142_2, . . . , and 1142_n may be reversed from side to side. Such a linear arrangement of the n string groups 1142_1, 1142_2, and 1142_n that involves no turns produces less short circuits between one and other string groups than a non-linear arrangement that involves turns, thus improving the safety of the power storage apparatus 1000.

In each of the n string groups 1142_1, 1142_2, . . . , and 1142_n, the strings 1160 are arranged in the back-and-forth direction DH2 (depth direction of the module battery 1021).

In each of the strings 1160, the first fuse 1184, the first cell 1180, the second cell 1181, the third cell 1182, the fourth cell 1183, and the second fuse 1185 are arranged in the right-left direction DH1.

The first cell 1180, the second cell 1181, the third cell 1182, and the fourth cell 1183 are each a cylindrical cell that has a cylindrical axis 1310 and is in a vertically upright position. The cylindrical axis 1310 extends in the up-down direction DV.

(Structure and Placement of Positive Bus)

Figure 9:
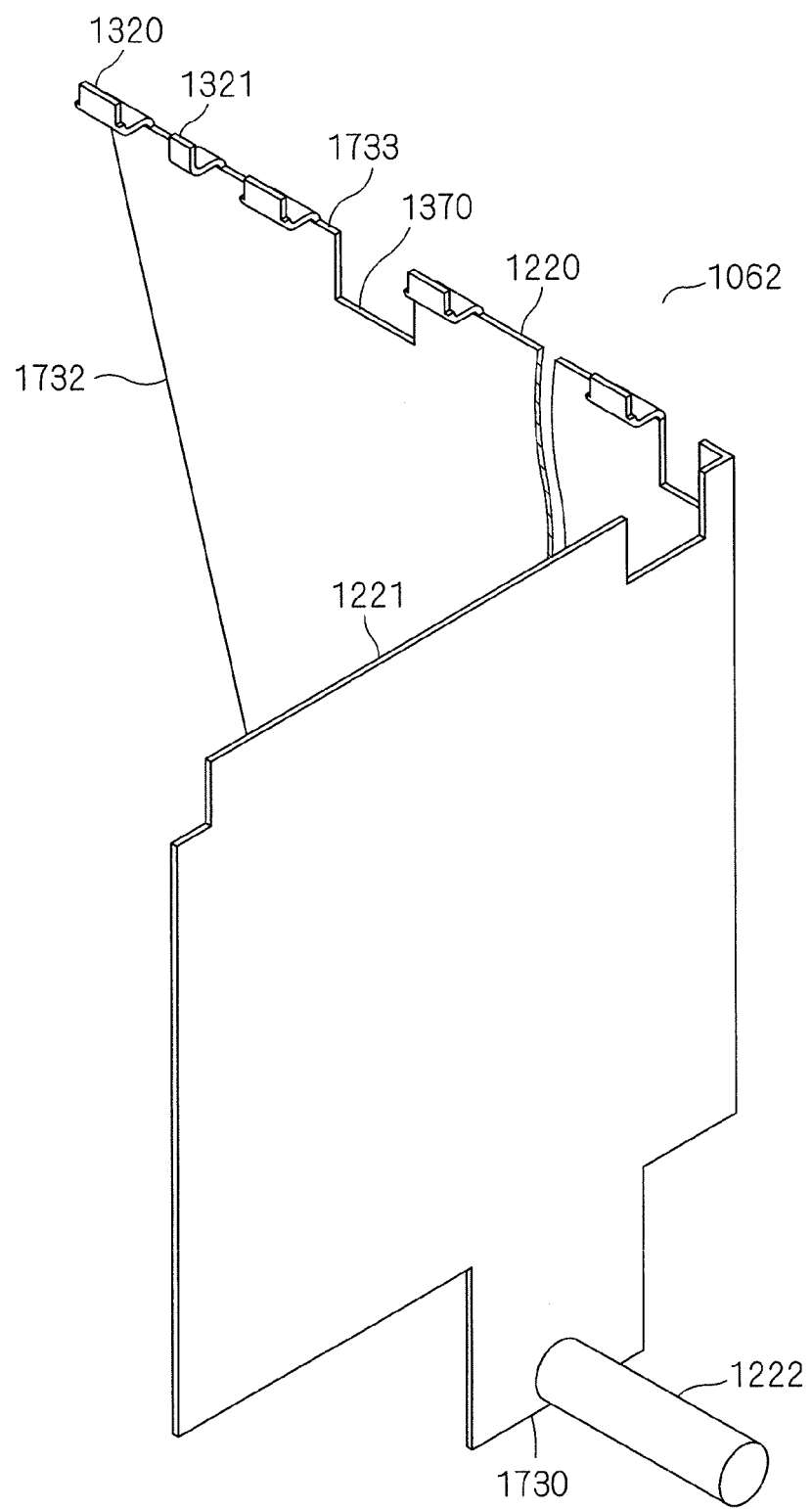
FIG. 9 is a perspective view of a positive bus.

A schematic diagram of FIG. 9 is a perspective view of the positive bus. A schematic diagram of FIG. 10 is a side view of the positive bus and its accessories.

Figure 10:
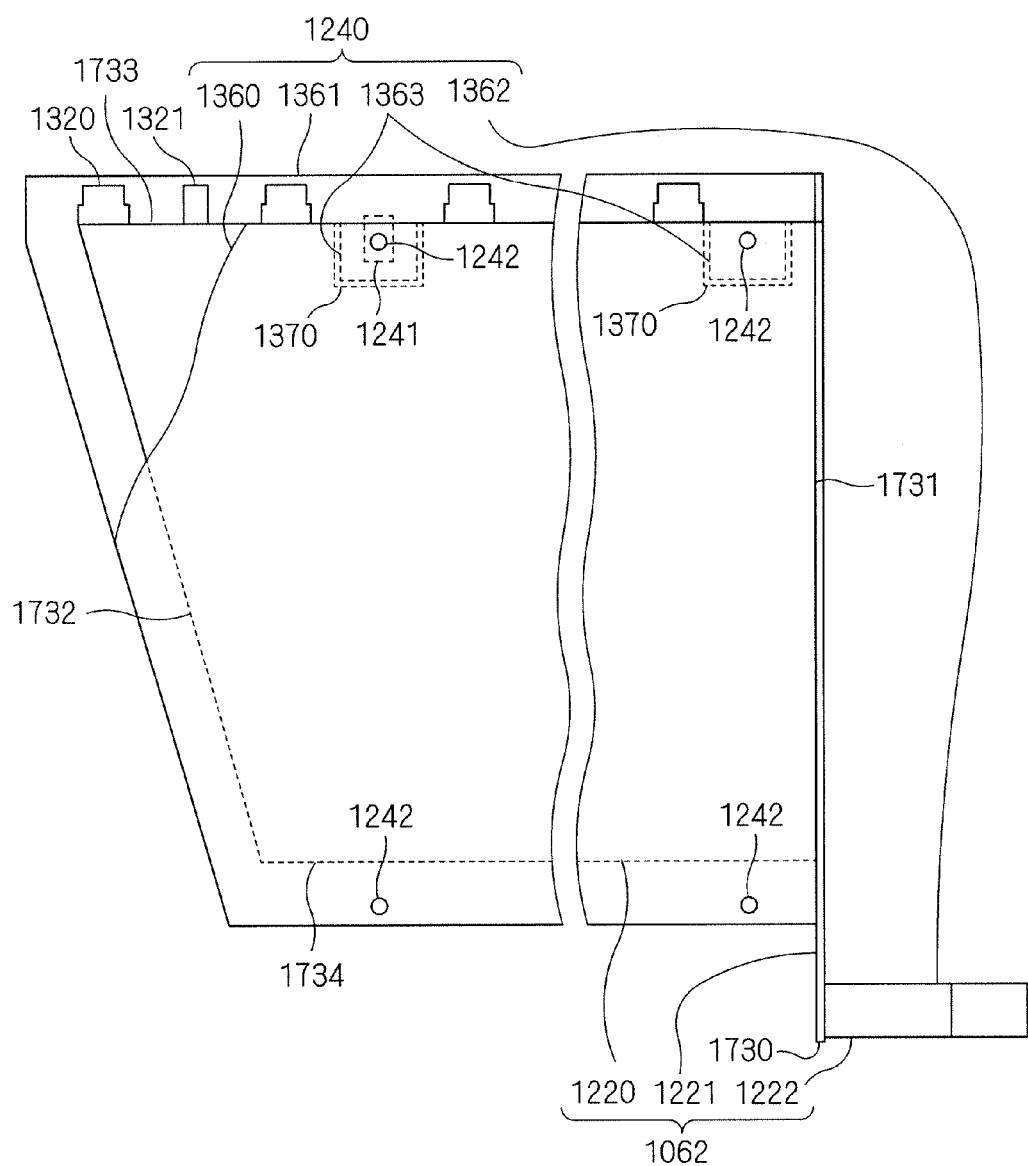
FIG. 10 is a side view of the positive bus and its accessories.

As illustrated in FIGS. 9 and 10, the positive bus 1062 includes a positive electrode current collecting plate 1220, a positive electrode extension plate 1221, and a positive pole 1222.

The positive electrode current collecting plate 1220 and the positive electrode extension plate 1221 are continuous. The positive electrode current collecting plate 1220 and the positive electrode extension plate 1221 constitute a single plate-like structure that is bent at the right angle, and are electrically connected to each other. Alternatively, the positive electrode current collecting plate 1220 and the positive electrode extension plate 1221 may be a joint assembly of two or more structures.

The plate-like shapes of the positive electrode current collecting plate 1220 and the positive electrode extension plate 1221 contribute to reducing the electrical resistance of the positive bus 1062. Alternatively, the positive electrode current collecting plate 1220 and the positive electrode extension plate 1221 may be replaced by components of different shapes other than plate-like shapes. For example, the positive electrode current collecting plate 1220 and the positive electrode extension plate 1221 may be replaced by rod-like or tube-like components.

The positive pole 1222 is coupled to the positive electrode extension plate 1221 in the accommodation space 1200 and is coupled to the positive bus bar 1064 outside the case 1060. The positive pole 1222 and the positive electrode extension plate 1221 are electrically connected to each other. The positive pole 1222 and the positive bus bar 1064 are electrically connected to each other.

The pole-like shape of the positive pole 1222 contributes to inhibiting absorption and emission of heat via the positive bus 1062. Alternatively, the positive pole 1222 may be replaced by a component of different shape other than the pole-like shape. For example, the positive pole 1222 may be replaced by a plate-like component.

Figure 5:
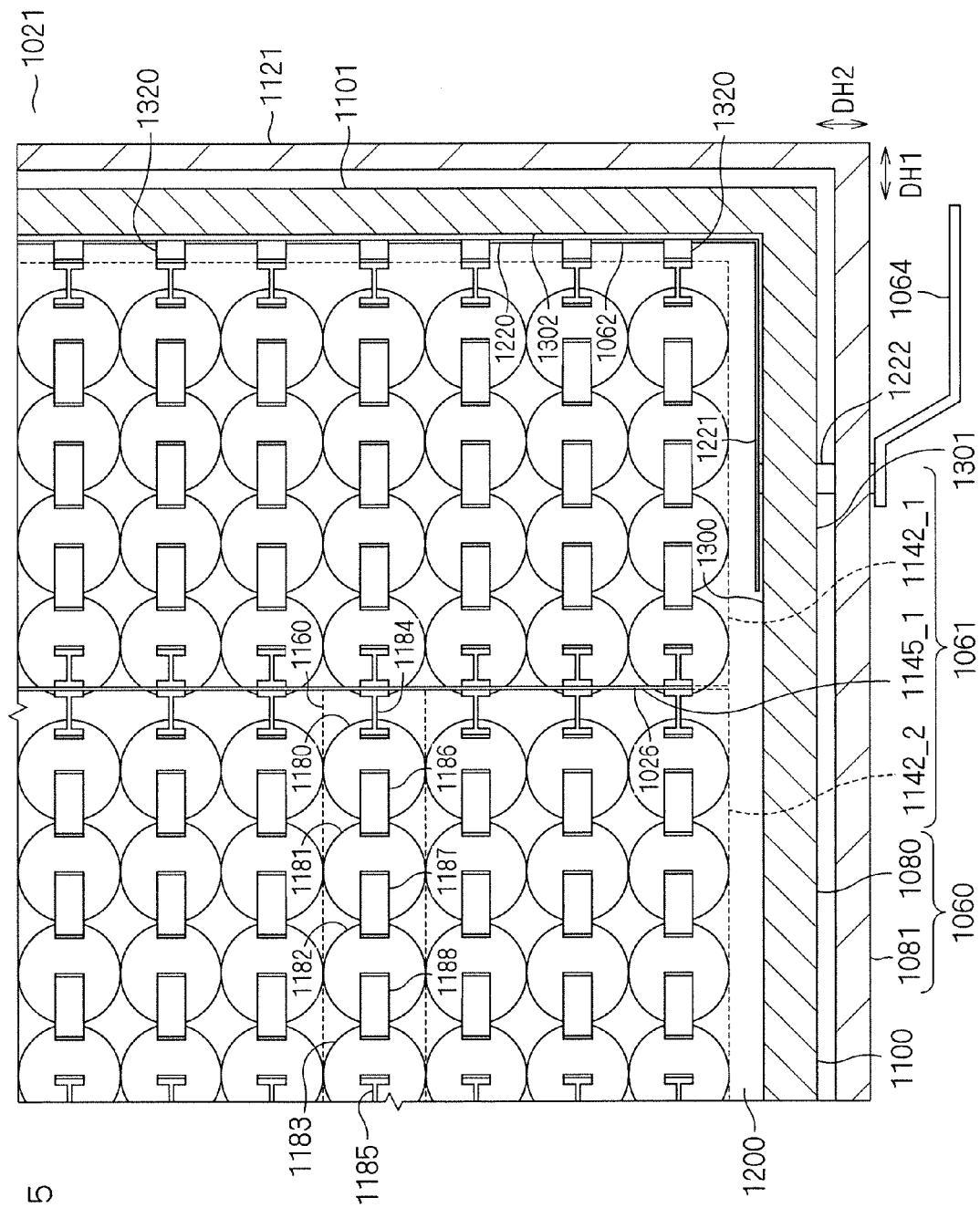
FIG. 5 is a horizontal cross-sectional view of the module battery.

As illustrated in FIGS. 3 and 5, the positive bus bar 1064 is exposed in the vicinity of the outer surface 1301 of the first side wall 1100. The positive bus bar 1064 is coupled to the first wire 1022 or the second wire 1023. Alternatively, the positive pole 1222 and the first wiring 1022 may be directly coupled to each other outside the case 1060 without going through the positive bus bar 1064, or the positive pole 1222 and the second wiring 1023 may be directly coupled to each other outside the case 1060 without going through the positive bus bar 1064.

Figure 7:
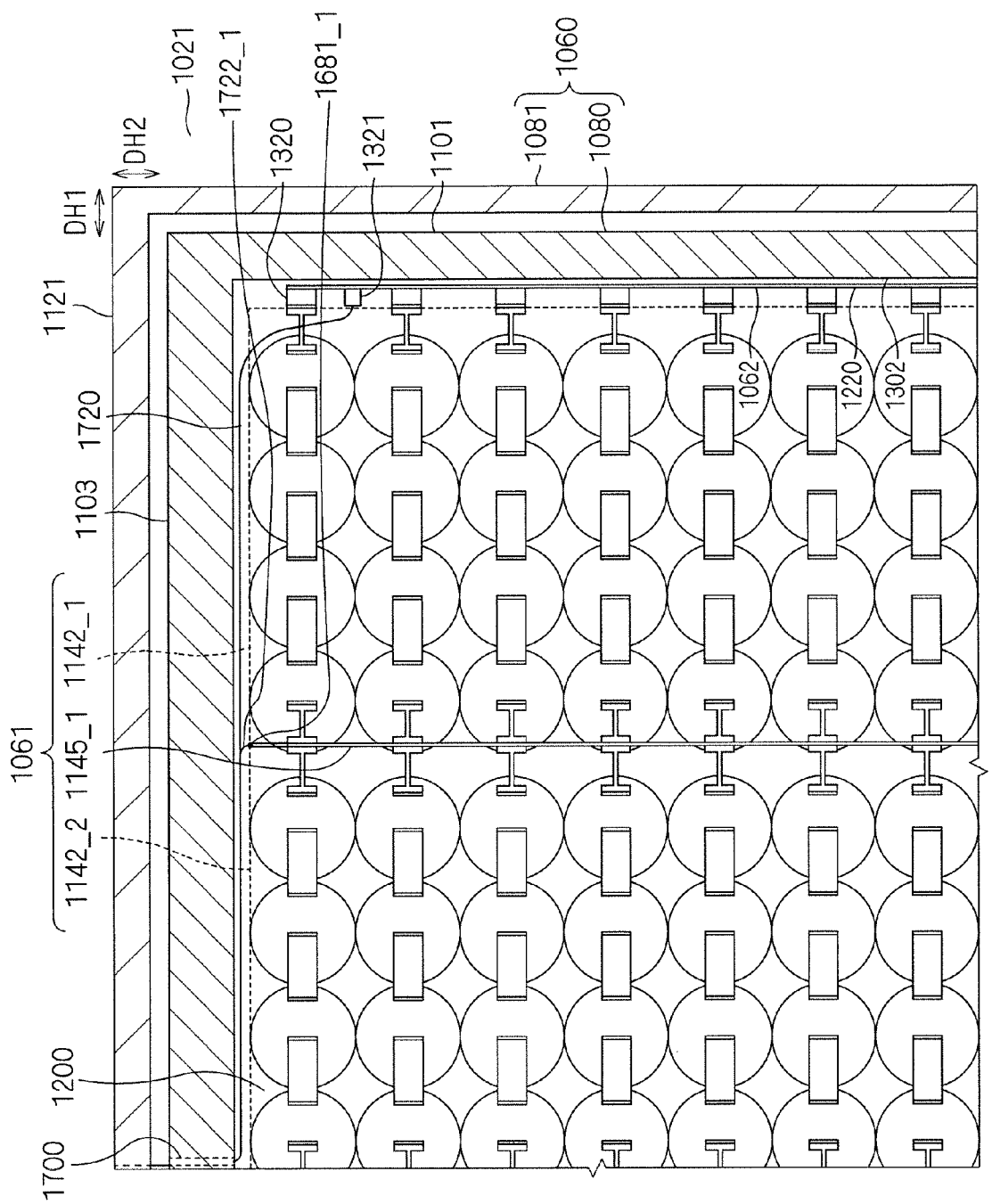
FIG. 7 is another horizontal cross-sectional view of the module battery.

As illustrated in FIGS. 4, 5, and 7, the positive electrode current collecting plate 1220 and the positive electrode extension plate 1221 are housed in the accommodation space 1200. The positive pole 1222 penetrates through the first side wall 1100. The positive electrode current collecting plate 1220 is along an inner surface 1302 of the second side wall 1101. The positive electrode current collecting plate 1220 is disposed in parallel with the inner surface 1302 of the second side wall 1101 in the space between the inner surface 1302 of the second side wall 1101 and the cell assembly 1061. The positive electrode extension plate 1221 is along an inner surface 1300 of the first side wall 1100. The positive electrode extension plate 1221 is disposed in parallel with the inner surface 1300 of the first side wall 1100 in the space between the inner surface 1300 of the first side wall 1100 and the cell assembly 1061.

As illustrated in FIGS. 9 and 10, the positive pole 1222 is coupled toward a lower end 1730 of the positive electrode extension plate 1221. A front end 1731 of the positive electrode current collecting plate 1220 is connected to the positive electrode extension plate 1221 and is elongated in the up-down direction DV. A rear end 1732 of the positive electrode current collecting plate 1220 is elongated in a direction inclined to the up-down direction DV. The length of the positive electrode current collecting plate 1220 in the back-and-forth direction DH2 is long toward an upper end 1733 and is short toward a lower end 1734. This facilitates the operation of housing the positive electrode current collecting plate 1220 in the accommodation space 1200.

(Structure and Placement of Negative Bus)

Figure 11:
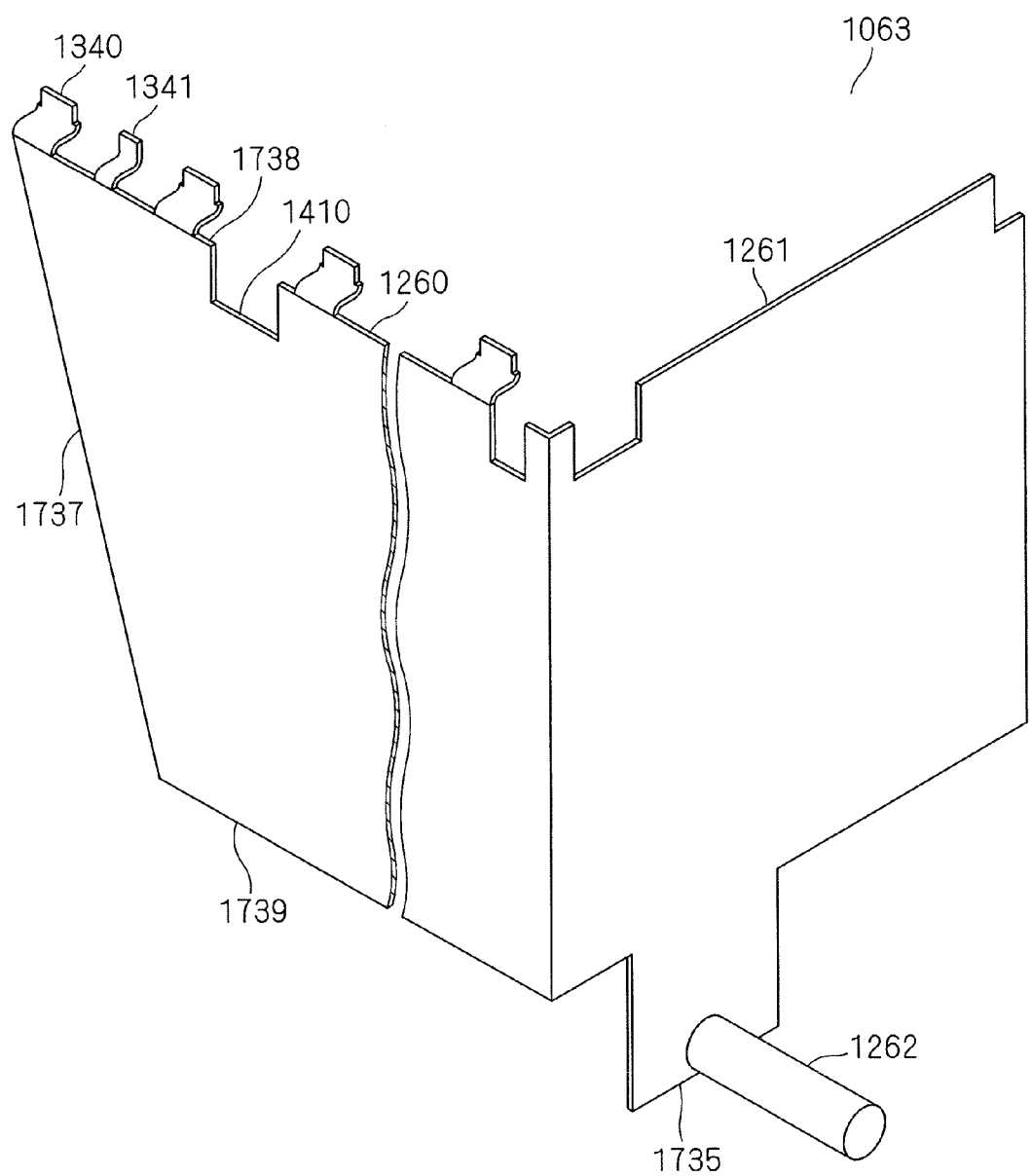
FIG. 11 is a perspective view of a negative bus.

A schematic diagram of FIG. 11 is a perspective view of the negative bus. A schematic diagram of FIG. 12 is a side view of the negative bus and its accessories.

Figure 12:
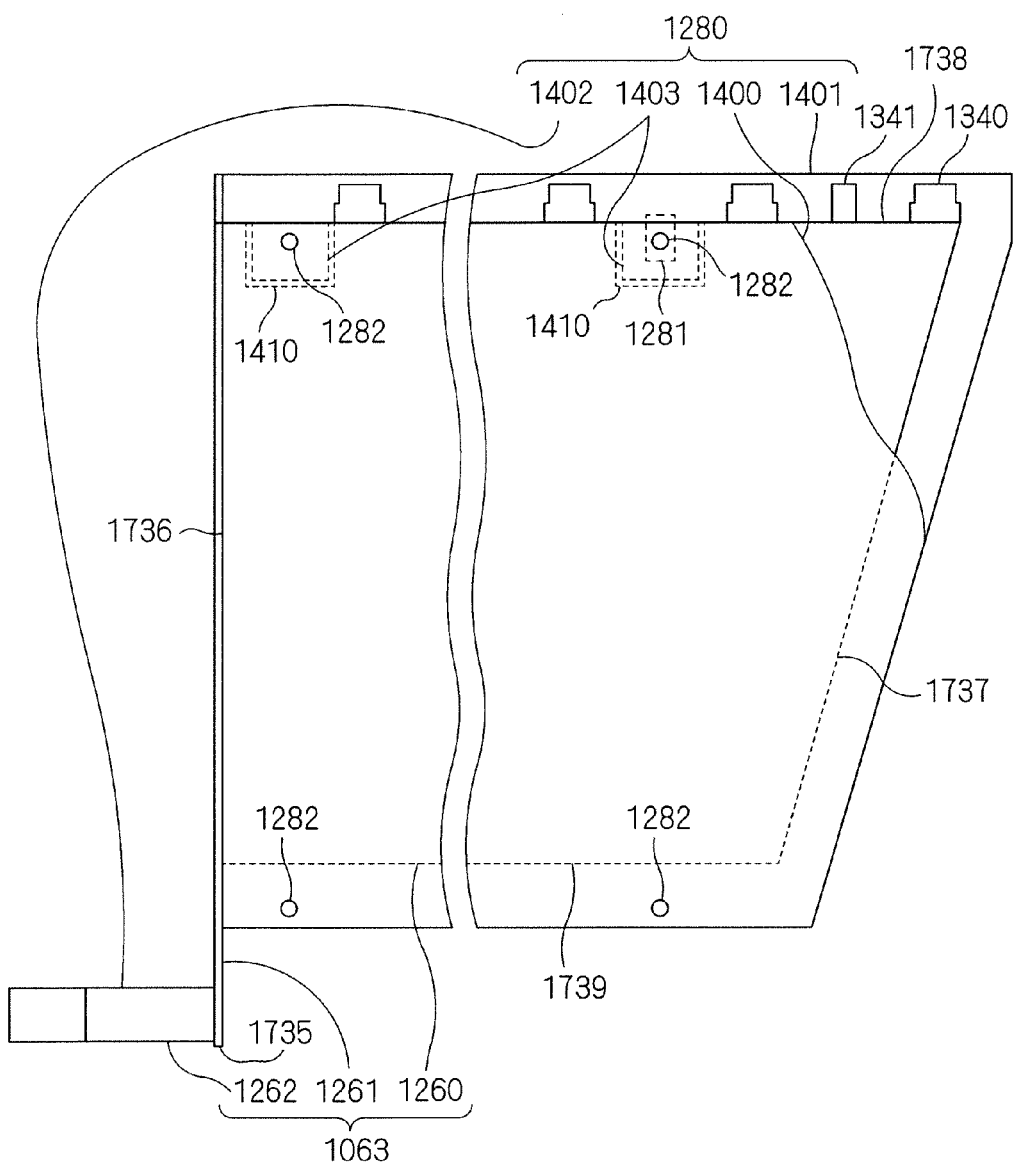
FIG. 12 is a side view of the negative bus and its accessories.

As illustrated in FIGS. 11 and 12, the negative bus 1063 includes a negative electrode current collecting plate 1260, a negative electrode extension plate 1261, and a negative pole 1262.

The negative electrode current collecting plate 1260 and the negative electrode extension plate 1261 are continuous. The negative electrode current collecting plate 1260 and the negative electrode extension plate 1261 constitute a single plate-like part that is bent at the right angle, and are electrically connected to each other. Alternatively, the negative electrode current collecting plate 1260 and the negative electrode extension plate 1261 may be a joint assembly of two or more parts.

The plate-like shapes of the negative electrode current collecting plate 1260 and the negative electrode extension plate 1261 contribute to reducing the electrical resistance of the negative bus 1063. Alternatively, the negative electrode current collecting plate 1260 and the negative electrode extension plate 1261 may be replaced by components of different shapes other than plate-like forms. For example, the negative electrode current collecting plate 1260 and the negative electrode extension plate 1261 may be replaced by rod-like or tube-like components.

The negative pole 1262 is coupled to the negative electrode extension plate 1261 in the accommodation space 1200 and is coupled to the negative bus bar 1065 outside the case 1060. The negative pole 1262 and the negative electrode extension plate 1261 are electrically connected to each other. The negative pole 1262 and the negative bus bar 1065 are electrically connected to each other.

The pole-like shape of the negative pole 1262 contributes to inhibiting absorption and emission of heat via the negative bus 1063. Alternatively, the negative pole 1262 may be replaced by a component of different shape other than pole-like forms. For example, the negative pole 1262 may be replaced by a plate-like component.

Figure 6:
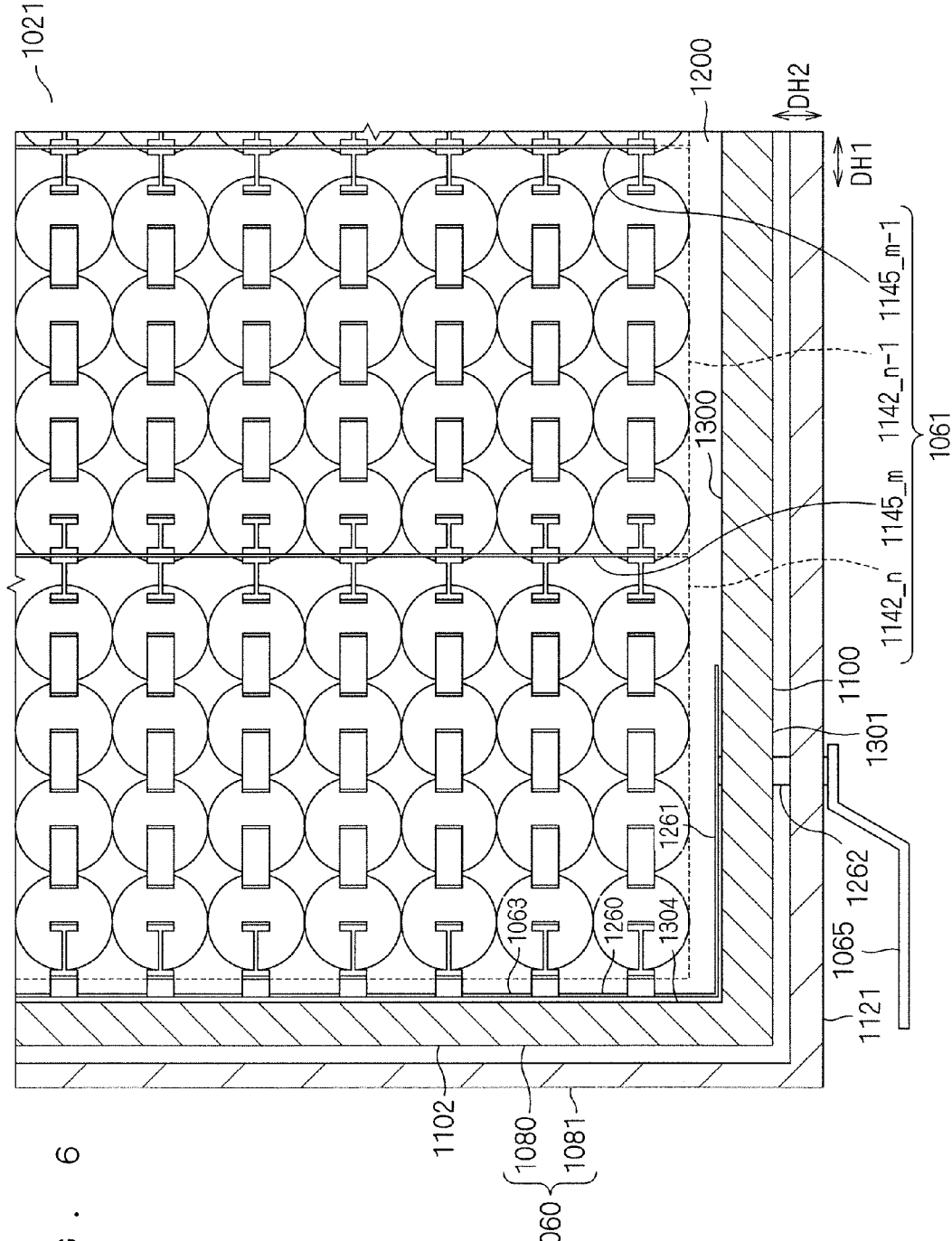
FIG. 6 is another horizontal cross-sectional view of the module battery.

As illustrated in FIGS. 3 and 6, the negative bus bar 1065 is exposed in the vicinity of the outer surface 1301 of the first side wall 1100. The negative bus bar 1065 is coupled to the first wire 1022 or the second wire 1023. Alternatively, the negative pole 1262 and the first wire 1022 may be directly coupled to each other outside the case 1060 without going through the negative bus bar 1065, or the negative pole 1262 and the second wire 1023 may be directly coupled to each other outside the case 1060 without going through the negative bus bar 1065.

Figure 8:
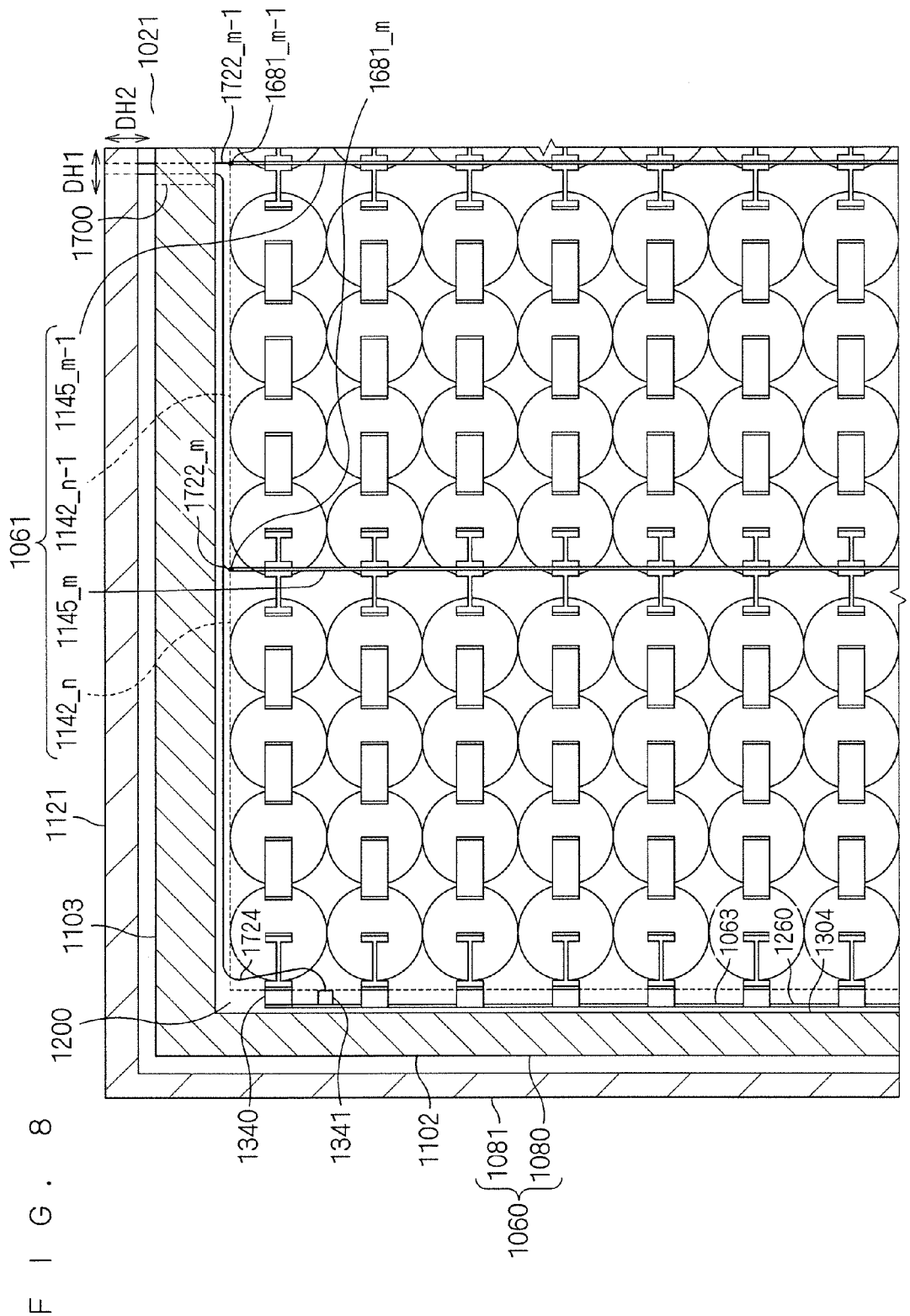
FIG. 8 is another horizontal cross-sectional view of the module battery.

As illustrated in FIGS. 4, 6, and 8, the negative electrode current collecting plate 1260 and the negative electrode extension plate 1261 are housed in the accommodation space 1200. The negative pole 1262 penetrates through the first side wall 1100.

The negative electrode current collecting plate 1260 is along an inner surface 1304 of the third side wall 1102. The negative electrode current collecting plate 1260 is disposed in parallel with the inner surface 1304 of the third side wall 1102 in the space between the inner surface 1304 of the third side wall 1102 and the cell assembly 1061. The negative electrode extension plate 1261 is along the inner surface 1300 of the first side wall 1100. The negative electrode extension plate 1261 is disposed in parallel with the inner surface 1300 of the first side wall 1100 in the space between the inner surface 1300 of the first side wall 1100 and the cell assembly 1061.

As illustrated in FIGS. 11 and 12, the negative pole 1262 is coupled toward a lower end 1735 of the negative electrode extension plate 1261. A front end 1736 of the negative electrode current collecting plate 1260 is connected to the negative electrode extension plate 1261 and is elongated in the up-down direction DV. A rear end 1737 of the negative electrode current collecting plate 1260 is elongated in a direction inclined to the up-down direction DV. The length of the negative electrode current collecting plate 1260 in the back-and-forth direction DH2 is long toward an upper end 1738 and is short toward a lower end 1739. This facilitates the operation of housing the negative electrode current collecting plate 1260 in the accommodation space 1200.

(Ease of Assembly)

As illustrated in FIG. 1, the outer surface 1301 of the first side wall 1100 does not face the other 39 module batteries 1021. Thus, when the positive bus bar 1064 and the negative bus bar 1065, which are exposed in the vicinity of the outer surface 1301 of the first side wall 1100, are coupled to the first wire 1022 or the second wire 1023, the other 39 module batteries 1021 will not inhibit the coupling of the module battery 1021 to the first wire 1022 or the second wire 1023. This facilitates the assembly of the power storage apparatus 1000.

(Accessories of Positive Bus)

As illustrated in FIG. 10, the positive bus 1062 has a positive electrode insulator 1240, positioning metal fittings 1241, and rivets 1242 attached thereto.

The positive electrode insulator 1240 includes an inner-surface coating mica plate 1360, an outer-surface coating mica plate 1361, a pole coating mica plate 1362, and spacer mica plates 1363. Most of the inner surface of the positive bus 1062 is covered with the inner-surface coating mica plate 1360. Most of the outer surface of the positive bus 1062 is covered with the outer-surface coating mica plate 1361. The inner-surface coating mica plate 1360 and the outer-surface coating mica plate 1361 are coupled to each other with the rivet 1242. The spacer mica plates 1363 are disposed at positions of notches 1370 of the positive bus 1062. At the positions of the notches 1370 of the positive bus 1062, the inner-surface coating mica plate 1360 and the outer-surface coating mica plate 1361 are coupled to each other with the rivets 1242, with the spacer mica plates 1363 sandwiched therebetween.

(Accessories of Negative Bus)

As illustrated in FIG. 12, the negative bus 1063 has a negative electrode insulator 1280, positioning metal fittings 1281, and rivets 1282 attached thereto.

The negative electrode insulator 1280 includes an inner-surface coating mica plate 1400, an outer-surface coating mica plate 1401, a pole coating mica plate 1402, and spacer mica plates 1403. Most of the inner surface of the negative bus 1063 is covered with the inner-surface coating mica plate 1400. Most of the outer surface of the negative bus 1063 is covered with the outer-surface coating mica plate 1401. The inner-surface coating mica plate 1400 and the outer-surface coating mica plate 1401 are coupled to each other with the rivets 1282. The spacer mica plate 1403 is disposed at positions of notches 1410 of the negative bus 1063. At the positions of the notches 1410 of the negative bus 1063, the inner-surface coating mica plate 1400 and the outer-surface coating mica plate 1401 are coupled to each other with the rivets 1282, with the spacer mica plates 1403 sandwiched therebetween.

(Connection Between Strings)

Figure 13:
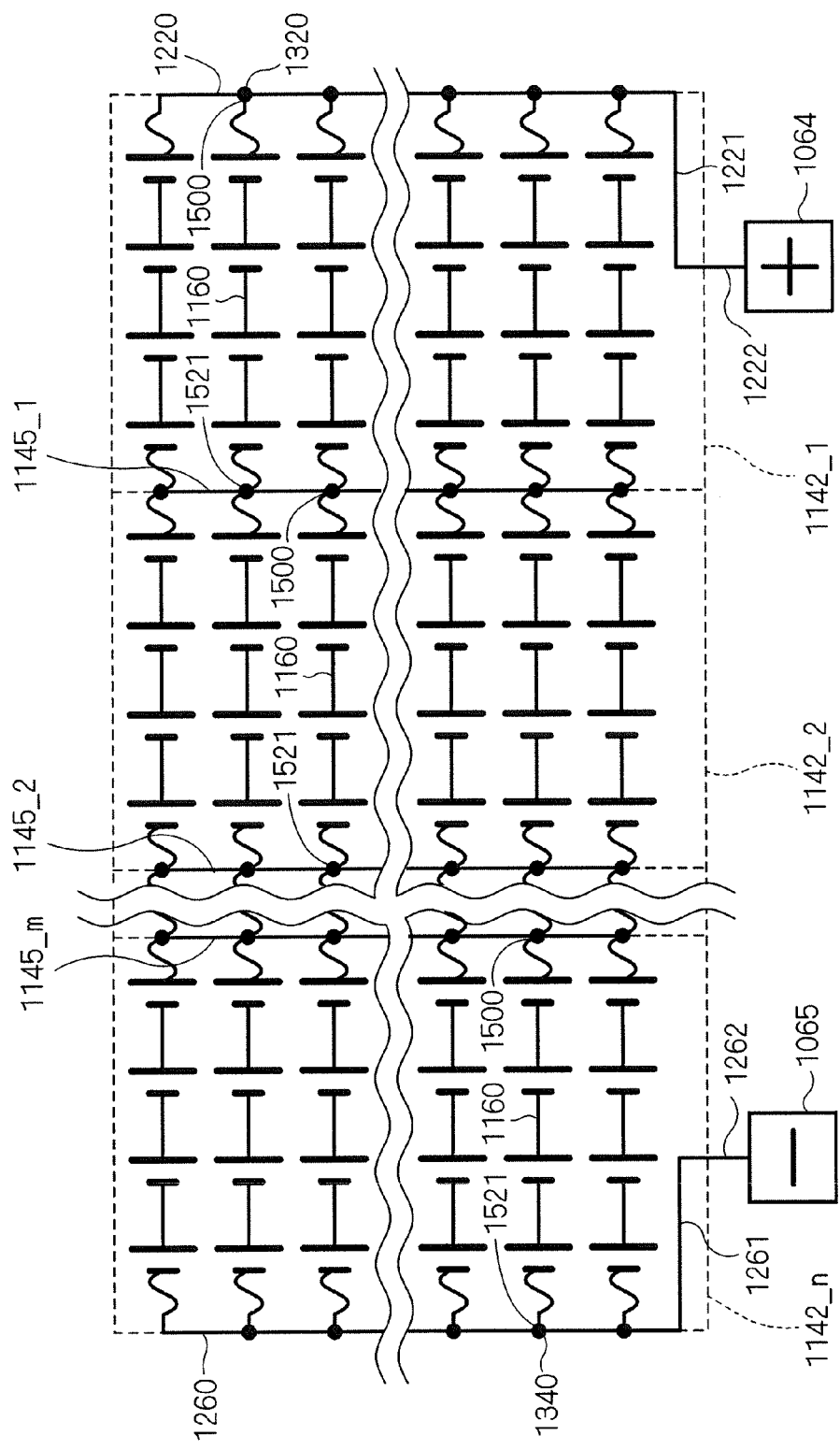
FIG. 13 is a circuit diagram of the module battery.

A circuit diagram of FIG. 13 illustrates a module battery.

As illustrated in FIGS. 9, 10, and 13, the positive electrode current collecting plate 1220 includes p connection terminals 1320. The p connection terminals 1320 are at the upper end 1733 of the positive electrode current collecting plate 1220. As illustrated in FIGS. 11, 12, and 13, the negative electrode current collecting plate 1260 includes p connection terminals 1340. The p connection terminals 1340 are at the upper end 1738 of the negative electrode current collecting plate 1260.

As illustrated in FIG. 13, a positive terminal 1500 of each of the p strings 1160 that belong to the first string group 1142_1, which is disposed furthest to the positive electrode side, is coupled to one of the p connection terminals 1320. A negative terminal 1521 of each of the p strings 1160 of the first string group 1142_1 is coupled to the first parallel bus 1145_1. The p strings 1160 of the first string group 1142_1 are connected in parallel via the positive electrode current collecting plate 1220 and the first parallel bus 1145_1, forming a first block. The current flowing to the first block divides and flows through the p strings 1160 of the first string group 1142_1.

If an integer i is in the range of 2 to n−1, the positive terminal 1500 of each of the p strings 1160 that belong to the ith string group 1142_i is coupled to the (i−1)th parallel bus 1145_i−1. The negative terminal 1521 of each of the p strings 1160 of the ith string group 1142_i is coupled to the ith parallel bus 1145_i. The p strings 1160 of the ith string group 1142_i are connected in parallel via the (i−1)th parallel bus 1145_i−1 and the ith parallel bus 1145_i, forming the ith block. The current flowing to the ith block divides and flows through the p strings 1160 of the ith string group 1142_i.

The positive terminal 1500 of each of the p strings 1160 that belong to the nth string group 1142_n, which is disposed furthest to the negative electrode side, is coupled to the mth parallel bus 1145_m. The negative terminal 1521 of each of the p strings 1160 of the nth string group 1142_n are electrically coupled to one of the p connection terminals 1340. The p strings 1160 of the nth string group 1142_n are connected in parallel via the mth parallel bus 1145_m and the negative electrode current collecting plate 1260, forming the nth block. The current flowing to the nth block divides and flows through the p strings 1160 of the nth string group 1142_n.

(Connection Inside String)

As illustrated in FIGS. 4 to 8, the first fuse 1184, the first cell 1180, the second cell 1181, the third cell 1182, the fourth cell 1183, and the second fuse 1185 in each of the strings 1160 are connected in series. The first cell 1180, the second cell 1181, the third cell 1182, and the fourth cell 1183 are connected in series by the first cell connector 1186, the second cell connector 1187, and the third cell connector 1188. Alternatively, a configuration is also possible in which all or some of the first cell connector 1186, the second cell connector 1187, and the third cell connector 1188 are omitted, and the negative terminals of cells and the positive terminals of the cells are directly connected to one another. The number of cells connected in series may increase or decrease. Also, both or either of the first fuse 1184 and the second fuse 1185 may be omitted.

The current flowing to the string 1160 flows through the first fuse 1184, the first cell 1180, the second cell 1181, the third cell 1182, the fourth cell 1183, and the second fuse 1185.

(Properties of Buses)

The buses including the positive bus 1062, the m parallel buses 1145_1, 1145_2, . . . , and 1145_m, the negative bus 1063, the positive bus bar 1064, and the negative bus bar 1065 are wiring structures that have low electrical resistance, high mechanical strength, and high heat resistance. They are typically plate-like or rod-like. Alternatively, all or some of the buses may be replaced by other types of wiring structures. For example, all or some of the buses may be replaced by cables.

The buses are desirably made of metals or alloys, more desirably, aluminum alloys.

The connection between the strings 1160 and the buses and the coupling of the buses are established by methods such as welding, swaging, or screwing that can resist high temperatures at which the sodium-sulfur batteries operate.

This establishes electrical connection between the strings 1160 and the buses and electrical connection of the buses.

(Positioning)

Figure 14:
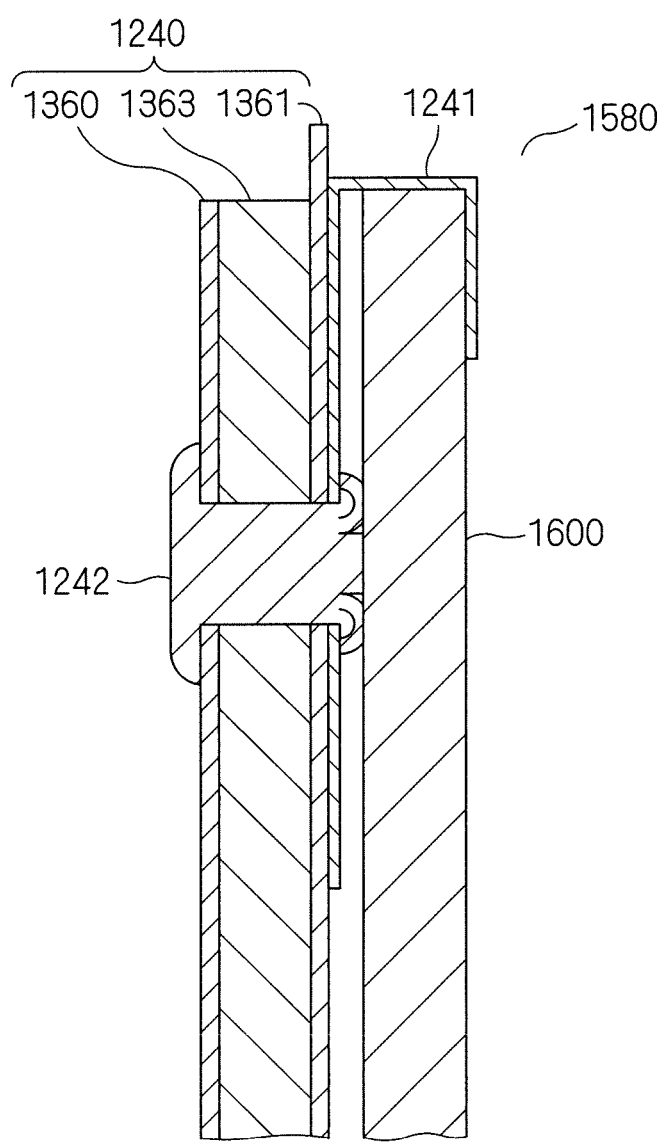
FIG. 14 is a cross-sectional view of a positive-electrode positioning mechanism.

A schematic diagram of FIG. 14 is a cross-sectional view of a positive-electrode positioning mechanism. A schematic diagram of FIG. 15 is a cross-sectional view of a negative-electrode positioning mechanism.

As illustrated in FIG. 14, a positive-electrode positioning mechanism 1580 includes the positioning metal fittings 1241 and a hook part 1600. The positioning metal fittings 1241 are hook-shaped and hooked on to the hook part 1600 of the case 1060. The positioning metal fittings 1241 are coupled to the outer-surface coating mica plate 1361 with the rivets 1242 at the positions of the notches 1370 of the positive bus 1062. This restricts vertical downward movement of the positive electrode current collecting plate 1220 from its base position.

Figure 15:
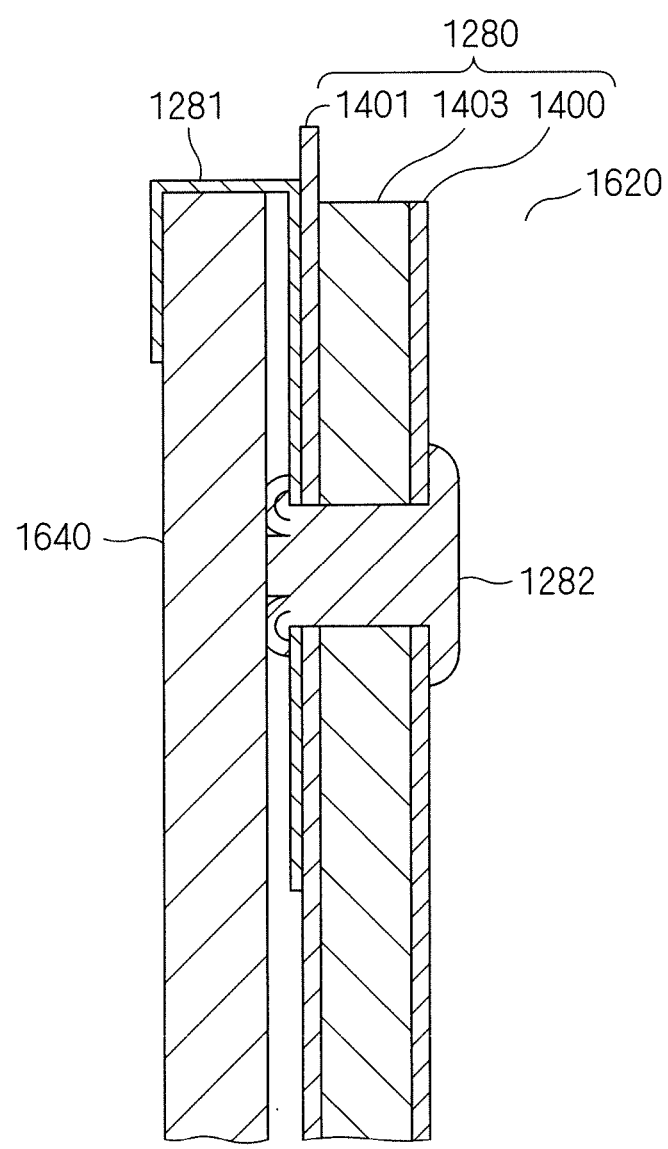
FIG. 15 is a cross-sectional view of a negative-electrode positioning mechanism.

As illustrated in FIG. 15, a negative-electrode positioning mechanism 1620 includes the positioning metal fittings 1281 and a hook part 1640. The positioning metal fittings 1281 are hook-shaped and hooked on to the hook part 1640 of the case 1060. The positioning metal fittings 1281 are coupled to the outer-surface coating mica plate 1401 with the rivets 1282 at the positions of the notches 1410 of the negative bus 1063. This restricts vertical downward movement of the negative electrode current collecting plate 1260 from its base position.

The positive-electrode positioning mechanism 1580 and the negative-electrode positioning mechanism 1620 stabilizes the structure of the module battery 1021. Alternatively, both or either of the positive-electrode positioning mechanism 1580 and the negative-electrode positioning mechanism 1620 may be replaced by other mechanisms having similar functions.

(Voltage Measuring Wire)

As illustrated in FIG. 9, the positive electrode current collecting plate 1220 includes a positive-voltage measuring terminal 1321. The positive-voltage measuring terminal 1321 is at the upper end 1733 of the positive electrode current collecting plate 1220. As illustrated in FIG. 11, the negative electrode current collecting plate 1260 includes a negative-voltage measuring terminal 1341. The negative-voltage measuring terminal 1341 is at the upper end 1738 of the negative electrode current collecting plate 1260. As illustrated in FIGS. 7 and 8, the parallel bus 1145_1,...,1145_m−1,1145_m respectively include intermediate-voltage measuring terminals 1681_1, ..., 1681_m−1, and 1681_m.

The case 1060 has an outlet 1700.

A positive-voltage measuring wire 1720 is electrically connected to the positive-voltage measuring terminal 1321. Intermediate-voltage measuring wires 1722_1, ..., 1722_m−1, and 1722_m are electrically connected to the intermediate-voltage measuring terminals 1681_1, ..., 1681_m−1, and 1681_m, respectively. A negative-voltage measuring wire 1724 is electrically connected to the negative-voltage measuring terminal 1341.

The positive-voltage measuring wire 1720, the intermediate-voltage measuring wires 1722_1, ..., 1722_m−1, and 1722_m, and the negative-voltage measuring wire 1724 are drawn to the outside of the case 1060 through the outlet 1700. The positive-voltage measuring wire 1720, the intermediate-voltage measuring wires 1722_1, ..., 1722_m−1, and 1722_m, and the negative-voltage measuring wire 1724 are used to measure the voltages across the n string groups 1142_1, 1142_2, ..., and 1142_n.

The positive-voltage measuring terminal 1321, the intermediate-voltage measuring terminals 1681_1, ..., 1681_m−1, and 1681_m, and the negative-voltage measuring terminal 1341 are within the accommodation space 1200. This enables accurate measurement of the voltages across the n string groups 1142_1, 1142_2, ..., and 1142_n and accordingly accurate detection of failures in cells.

While the invention has been shown and described in detail, the foregoing description is in all aspects illustrative and not restrictive. It is therefore to be understood that numerous modifications and variations can be devised without departing from the scope of the invention.

DESCRIPTION OF REFERENCE SIGNS

1000 Power storage apparatus
1021 Module battery
1022 First wire
1023 Second wire
1060 Case
1061 Cell assembly
1062 Positive bus
1063 Negative bus
1142_1, 1142_2, ..., 1142_n String group
1220 Positive electrode current collecting plate
1221 Positive electrode extension plate
1272 Positive pole
1260 Negative electrode current collecting plate
1261 Negative electrode extension plate
1262 Negative pole

The invention claimed is:

1. A power storage apparatus comprising:
two or more module batteries arranged in an array; and
wiring that connects said two or more module batteries,
each of said two or more module batteries including:
  a case that has an accommodation space therein and includes a first side wall, a second side wall, and a third side wall, said first side wall having a first inner surface and an outer surface, said second side wall having a second inner surface, said third side wall having a third inner surface, said outer surface facing in a first direction without facing the others of said two or more module batteries, said second side wall and said third side wall being spaced from each other in a second direction, and said first direction and said second direction being perpendicular to each other;
  a cell assembly that is housed in said accommodation space and includes two or more string groups that are connected in series, said two or more string groups being arranged linearly in said second direction, each of said two or more string groups including two or more strings that are connected in parallel, and each of said two or more strings including two or more cells that are connected in series;
  a positive bus that includes a positive electrode current collecting part, a positive electrode extension part, and a positive electrode feedthrough part, said positive electrode current collecting part and said positive electrode extension part being housed in said accommodation space, said positive electrode current collecting part extending along said second inner surface, said positive electrode extension part extending along said first inner surface, said positive electrode feedthrough part penetrating through said first side wall, and said positive electrode current collecting part, said positive electrode extension part, said positive electrode feedthrough part, and said wiring being electrically connected to one another; and a negative bus that includes a negative electrode current collecting part, a negative electrode extension part, and a negative electrode feedthrough part, said negative electrode current collecting part and said negative electrode extension part being housed in said accommodation space, said negative electrode current collecting part extending along said third inner surface, said negative electrode extension part extending along said first inner surface, said negative electrode feedthrough part penetrating through said first side wall, and said negative electrode current collecting part, said negative electrode extension part, said negative electrode feedthrough part, and said wiring being electrically connected to one another.

2. The power storage apparatus according to claim 1, wherein
each of said two or more module batteries further includes:
a positive-electrode positioning mechanism that restricts vertical downward movement of said positive electrode current collecting part from a base position of said positive electrode current collecting part; and
a negative-electrode positioning mechanism that restricts vertical downward movement of said negative electrode current collecting part from a base position of said negative electrode current collecting part.

3. The power storage apparatus according to claim 1, wherein
said case has an outlet,
said cell assembly further includes a parallel bus that connects said two or more strings in parallel, and
each of said two or more module batteries further includes:
a positive-voltage measuring wire that is connected to said positive electrode current collecting part and drawn to an outside of said case through said outlet;
a negative-voltage measuring wire that is connected to said negative electrode current collecting part and drawn to the outside of said case through said outlet; and
an intermediate-voltage measuring wire that is connected to said parallel bus and drawn to the outside of said case through said outlet.

4. The power storage apparatus according to claim 2, wherein
said case has an outlet,
said cell assembly further includes a parallel bus that connects said two or more strings in parallel, and
each of said two or more module batteries further includes:
a positive-voltage measuring wire that is connected to said positive electrode current collecting part and drawn to an outside of said case through said outlet;
a negative-voltage measuring wire that is connected to said negative electrode current collecting part and drawn to the outside of said case through said outlet; and
an intermediate-voltage measuring wire that is connected to said parallel bus and drawn to the outside of said case through said outlet.

* * * * *